(12) United States Patent
Tokumoto

(10) Patent No.: US 7,836,816 B2
(45) Date of Patent: Nov. 23, 2010

(54) RETAINING RING FOR FLUID PRESSURE CYLINDER

(75) Inventor: Shioto Tokumoto, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 372 days.

(21) Appl. No.: 11/951,006

(22) Filed: Dec. 5, 2007

(65) Prior Publication Data

US 2008/0134877 A1 Jun. 12, 2008

(30) Foreign Application Priority Data

Dec. 6, 2006 (JP) ............................. 2006-329542

(51) Int. Cl.
F15B 15/14 (2006.01)
F16B 21/18 (2006.01)

(52) U.S. Cl. ..................... 92/165 R; 92/128; 92/169.1; 92/177

(58) Field of Classification Search ................ 92/169.1, 92/177, 165, 128, 164
See application file for complete search history.

(56) References Cited

U.S. PATENT DOCUMENTS

| | | | |
|---|---|---|---|
| 2,983,256 A * | 5/1961 | Seeloff | 92/177 |
| 3,605,915 A * | 9/1971 | Gately et al. | 173/200 |
| 3,643,551 A * | 2/1972 | Berg | 92/164 |
| 3,913,460 A | 10/1975 | Wright | |
| 3,961,564 A | 6/1976 | Rich et al. | |
| 4,050,285 A * | 9/1977 | Bosch et al. | 91/442 |
| 4,896,584 A * | 1/1990 | Stoll et al. | 92/177 |
| 4,928,577 A * | 5/1990 | Stoll | 92/177 |
| 5,241,896 A * | 9/1993 | Braun et al. | 92/164 |
| 5,456,161 A | 10/1995 | Yuda et al. | |
| 5,701,800 A | 12/1997 | Kaup | |
| 5,850,776 A | 12/1998 | Takeuchi et al. | |
| 6,186,484 B1 | 2/2001 | Noda et al. | |
| 6,502,880 B1 * | 1/2003 | Sawdon | 92/177 |
| 6,526,870 B2 * | 3/2003 | Takanashi et al. | 92/177 |

FOREIGN PATENT DOCUMENTS

| | | |
|---|---|---|
| CN | 1080395 | 3/2002 |
| CN | 2694022 | 4/2005 |
| DE | 196 02 553 A1 | 7/1997 |
| DE | 299 16 190 U1 | 12/1999 |
| EP | 1489311 | 12/2004 |
| JP | 05-231407 | 9/1993 |
| JP | 07-010534 | 2/1995 |
| JP | 07-34239 | 6/1995 |
| JP | 3023136 | 4/1996 |
| JP | 09-303320 | 11/1997 |
| JP | 09303320 A * | 11/1997 |
| JP | 10-009213 | 1/1998 |

(Continued)

*Primary Examiner*—Thomas E Lazo
(74) *Attorney, Agent, or Firm*—Paul A. Guss

(57) ABSTRACT

A cylinder tube includes a cylinder hole therein through which a piston is displaceably inserted. A head cover and a rod cover are installed respectively into ends of the cylinder hole. Locking rings, each having a bent section, a pair of arm sections that extend from both ends of the bent section, and claw sections disposed on ends of the arm sections, are disposed in the cylinder hole. In addition, the locking rings are installed respectively in the cylinder hole through ring grooves, wherein the head cover and the rod cover are fixed by means of the locking rings.

10 Claims, 15 Drawing Sheets

FOREIGN PATENT DOCUMENTS

| | | |
|---|---|---|
| JP | 10-318213 | 12/1998 |
| JP | 10318213 A * | 12/1998 |
| JP | 11-311210 | 11/1999 |
| JP | 2000-088028 | 3/2000 |
| JP | 2003-88937 | 3/2003 |
| JP | 2005-320994 | 11/2005 |
| SU | 526726 | 8/1976 |
| SU | 1390449 | 4/1988 |

* cited by examiner

RETAINING RING FOR FLUID PRESSURE CYLINDER

BACKGROUND OF THE INVENTION

1. Field of the Invention

The present invention relates to a retaining ring for use in a fluid pressure cylinder, in which a piston is displaced along an axial direction under the supply of a pressure fluid, and for fixing cover members with respect to a cylinder body in which the piston is installed.

2. Description of the Related Art

Heretofore, a fluid pressure cylinder, having a piston therein displaced under the supply of a pressure fluid, has been used, for example, as a transport device for transporting various workpieces and the like. In such a fluid pressure cylinder, a construction is provided in which a piston is disposed displaceably inside of a cylinder chamber, which is defined at the interior of a tubular cylinder body and is substantially circularly shaped in cross section, and cover members are installed respectively on both ends of the cylinder body, thereby closing the cylinder chamber.

In such a fluid pressure cylinder, for example as disclosed in Japanese Laid-Open Patent Publication No. 10-318213, when cover members are fixed onto the cylinder body, the cover members are affixed through engagement of retaining rings into annular grooves that are formed on an inner circumferential surface of the cylinder chamber, such that the retaining rings project from the inner wall surface thereof. The retaining rings are formed with a roughly C-shaped cross section having an opening therein, and the retaining rings have an elastic force which acts to expand the retaining rings radially outward.

On the other hand, as disclosed in Japanese Laid-Open Patent Publication No. 2003-088937, this type of retaining ring may be provided with a pair of holes at the open ends of the retaining ring. A machine tool is inserted into the holes and the retaining ring is deformed such that the open ends thereof are displaced in directions to mutually approach each other. As a result, the cross sectionally C-shaped retaining ring is deformed so as to be reduced in diameter, and thus, for example, can be installed into an annular groove formed on the inner wall surface of the cylinder chamber.

The fluid pressure cylinder in which the above-mentioned retaining rings are disposed may include a cylinder body equipped with an elliptically shaped cylinder chamber in cross section, with a major axis thereof lying in the horizontal direction. By providing a piston, which also is elliptically shaped in cross section, displaceably inside of the cylinder chamber, a flat shape may be realized that is thin-shaped. In this case, because the cover members also are formed so as to be elliptically shaped in cross section, it may be considered to form the retaining rings with a pair of straight sections corresponding to the cross sectional shape of the cylinder chamber, wherein the straight sections abut against flat surface regions of the cylinder chamber that is formed with the elliptically shaped cross section, and the bent section of the retaining rings is installed so as to abut against an arcuate region of the cylinder chamber.

However, with retaining rings having such straight sections, when holes are provided on end portions of the straight sections, although the straight sections are capable of being deformed by a machine tool that is inserted into the holes, because the holes and the bent section are separated from each other, there is a concern that the amount at which the bent section is deformed may become too small. As a result, deformation of the retaining rings by a desired amount, and installation of the retaining rings with respect to a cylinder chamber having an elliptically shaped cross section, become difficult to perform.

Further, although it might be considered to install the aforementioned cross sectionally C-shaped retaining rings respectively into an arcuate region of the cylinder chamber, whereby an individual cover member is fixed by a pair a retaining rings, because the retaining rings only engage within the arcuate section of the cylinder chamber through an annular groove, there is a concern that the holding force of the cover member by the retaining rings may be lowered.

SUMMARY OF THE INVENTION

A general object of the present invention is to provide a retaining ring for use in a fluid pressure cylinder, which can be reliably installed for fixing a cover member with respect to a cylinder body having a cross sectionally elliptically shaped cylinder chamber.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

With reference to the attached drawings, detailed explanations shall be given below of a preferred embodiment of a retaining ring according to the present invention, which is used in a fluid pressure cylinder.

Figure 1:
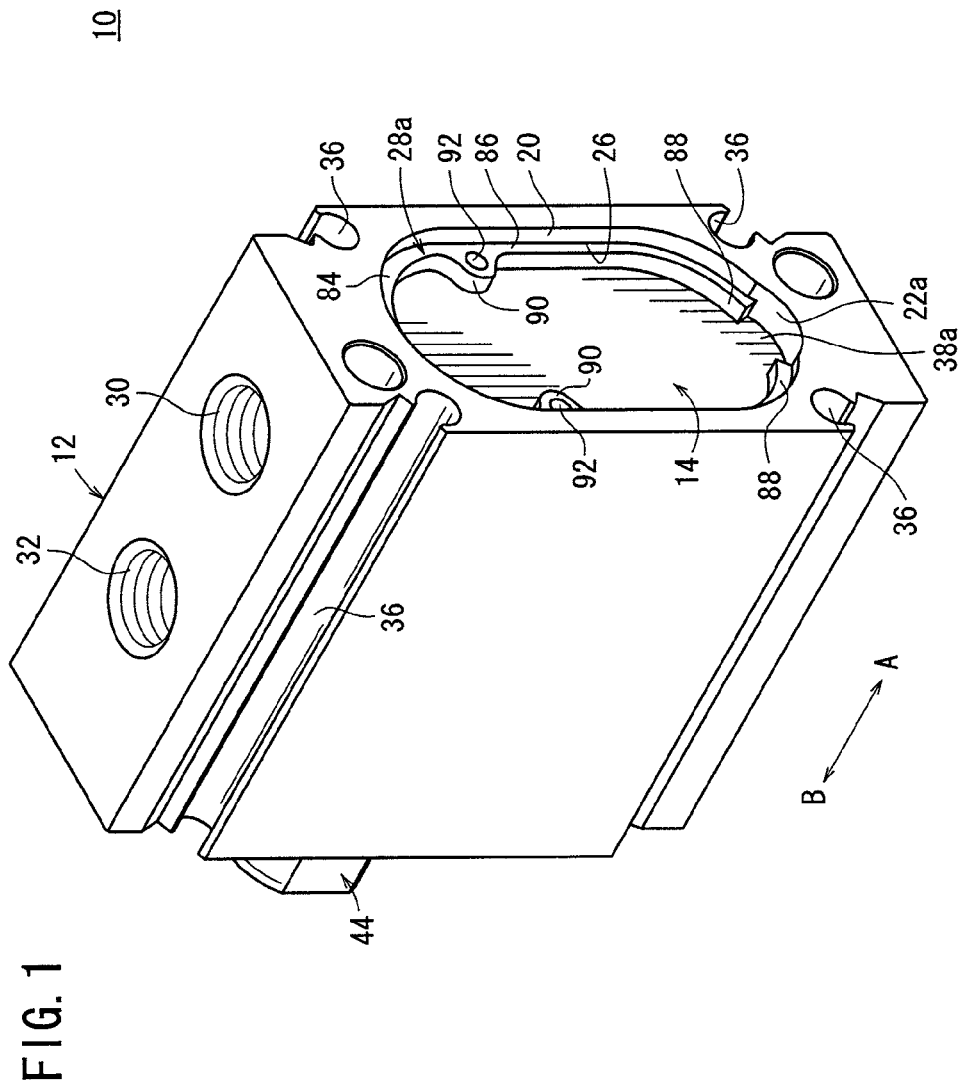
FIG. 1 is an exterior perspective view of a fluid pressure cylinder in which a retaining ring according to an embodiment of the present invention is used.
Figure 2:
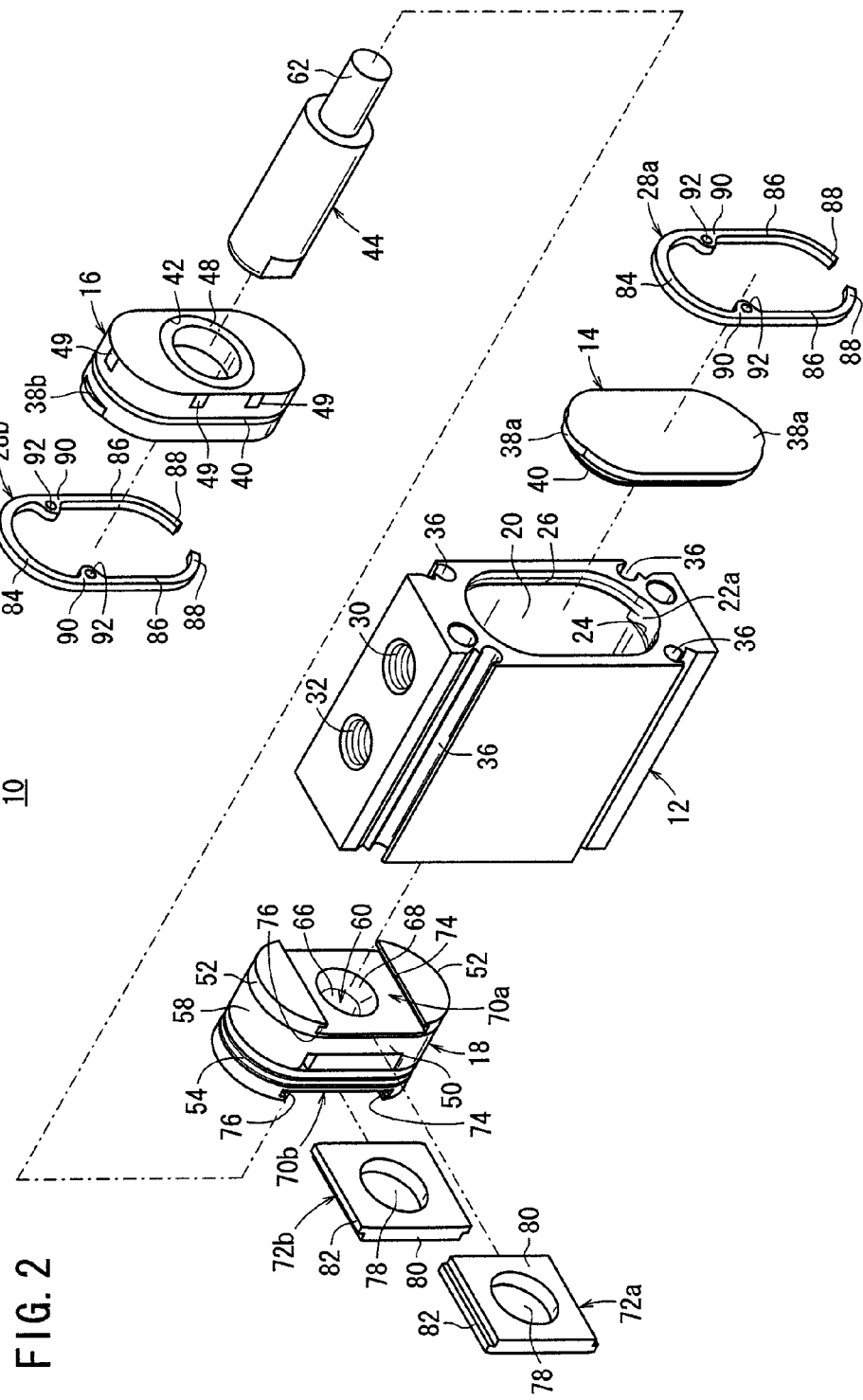
FIG. 2 is an exploded perspective view of the fluid pressure cylinder shown in FIG. 1.
Figure 3:
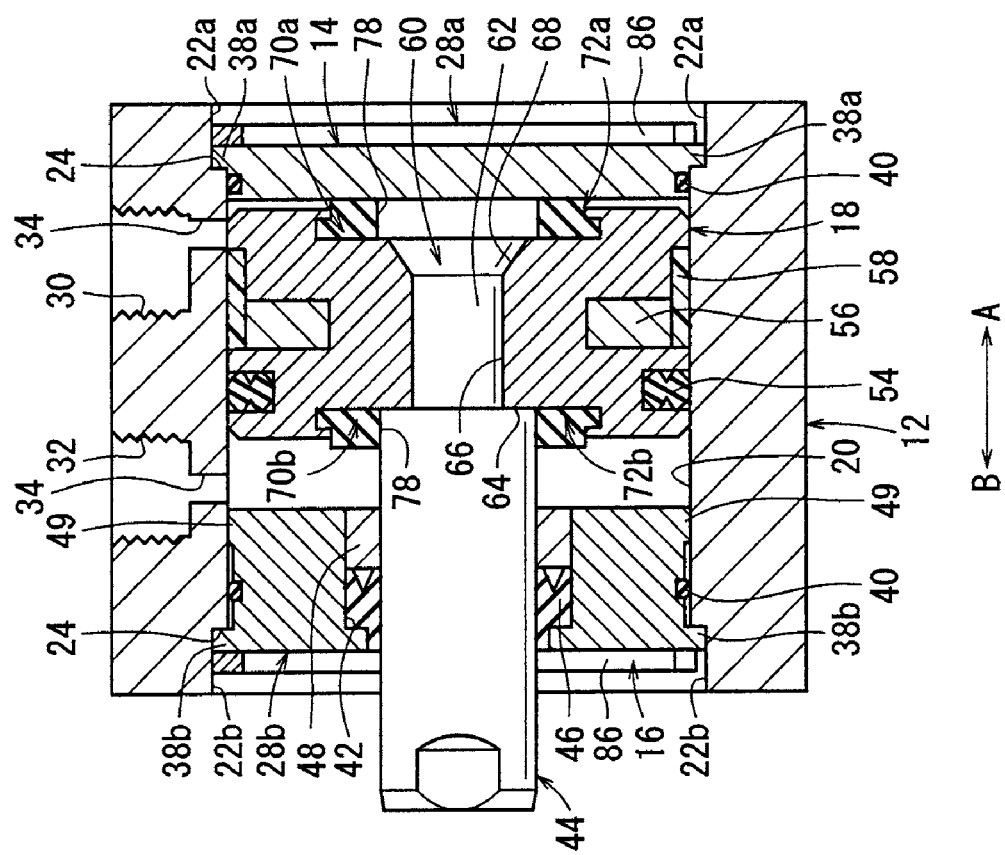
FIG. 3 is an overall vertical cross sectional view of the fluid pressure cylinder shown in FIG. 1.
Figure 4:
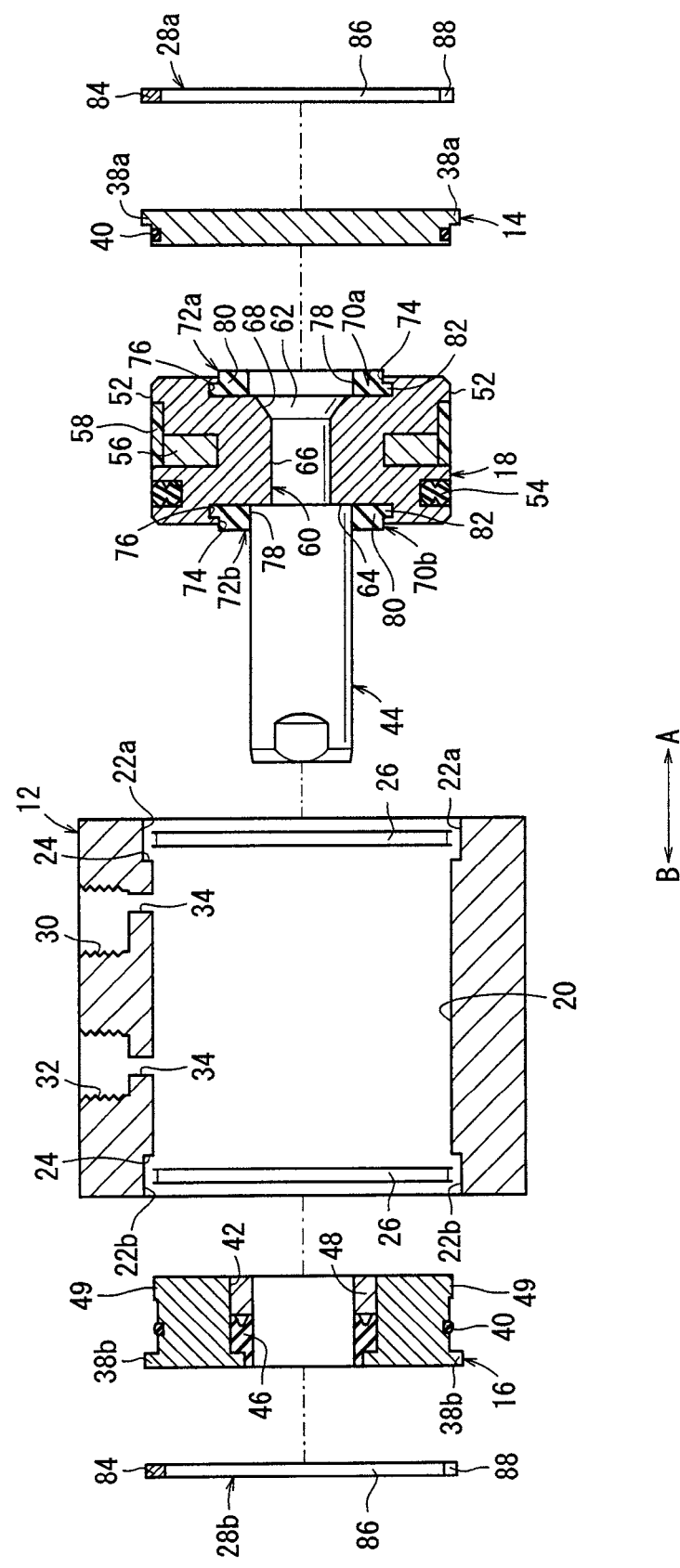
FIG. 4 is an exploded vertical cross sectional view of the fluid pressure cylinder shown in FIG. 3.

In FIG. 1, reference numeral 10 indicates a fluid pressure cylinder employing a retaining ring according to an embodiment of the present invention.

As shown in FIGS. 1 to 4, the fluid pressure cylinder 10 includes a tubular shaped cylinder tube (cylinder body) 12, a head cover (cover member) 14 installed on one end of the cylinder tube 12, a rod cover (cover member) 16 installed on the other end of the cylinder tube 12, and a piston 18 disposed displaceably inside the cylinder tube 12.

Figure 5:
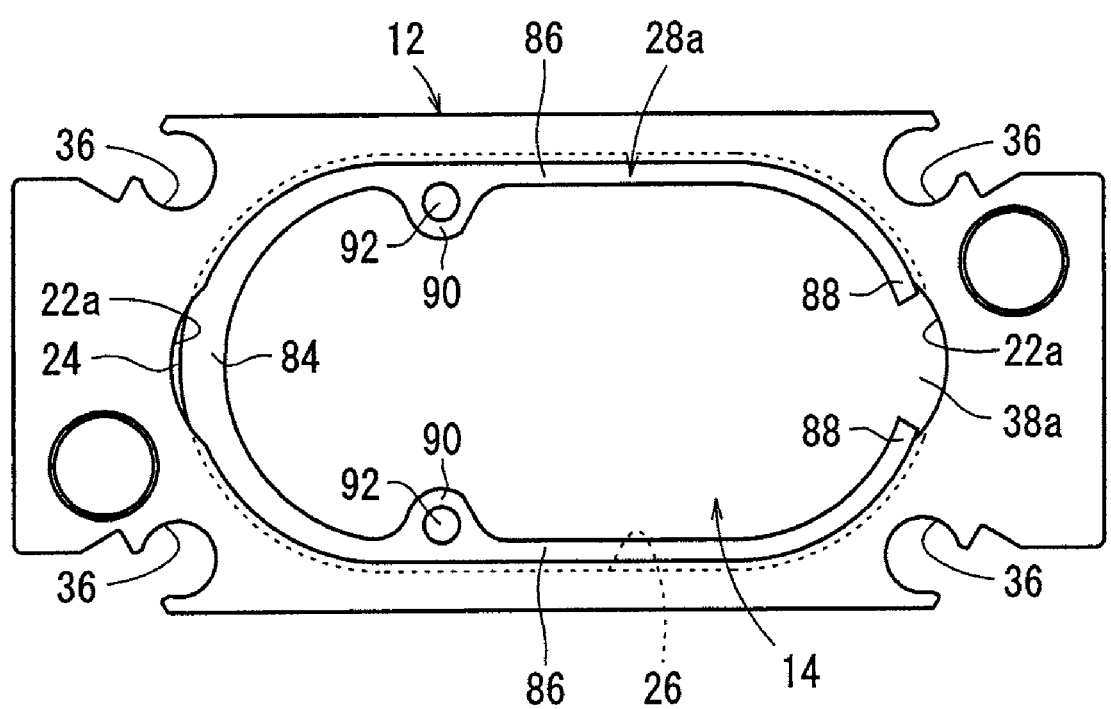
FIG. 5 is a side surface view, as viewed from a head cover side of the fluid pressure cylinder shown in FIG. 1.
Figure 6:
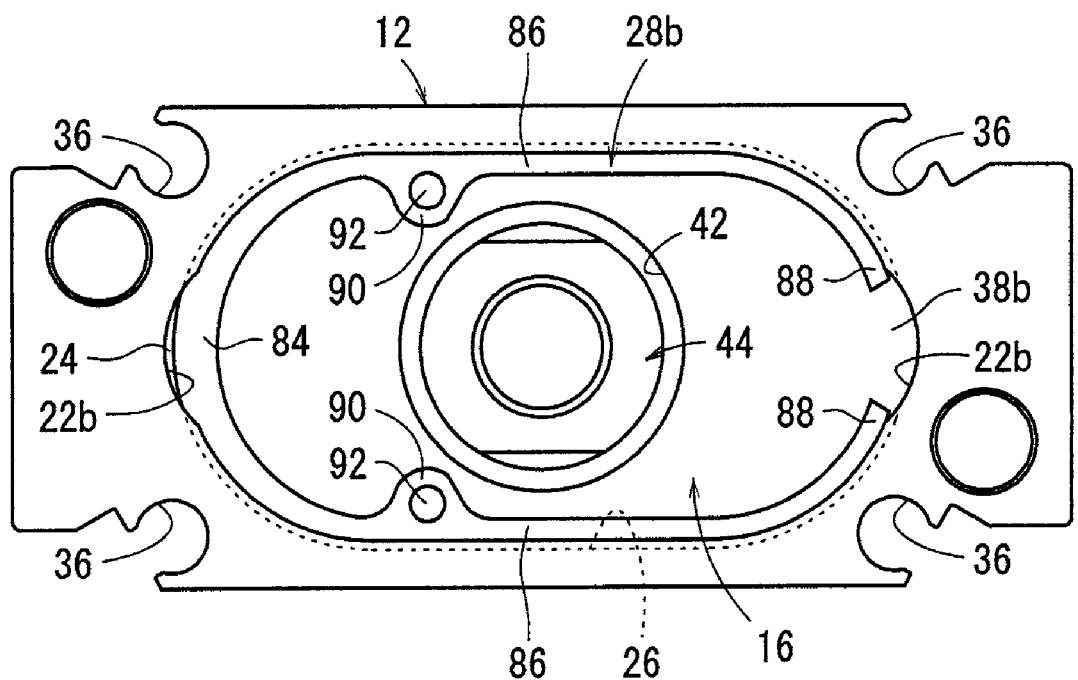
FIG. 6 is a side surface view, as viewed from a rod cover side of the fluid pressure cylinder shown in FIG. 1.

The cylinder tube 12 is constructed with a substantially rectangular shape in cross section, having a cylinder hole (cylinder chamber) 20, which is substantially elliptically shaped in cross section, penetrating in the axial direction inside the cylinder tube 12. The cylinder hole 20 is formed so as to be substantially elliptically shaped in cross section such that the major axis thereof lies substantially in the horizontal direction (when the fluid pressure cylinder 10 is oriented as shown in FIGS. 5 and 6), and wherein on both ends thereof, a pair of recesses 22a, 22b are provided, which are expanded in width in directions away from the center of the cylinder hole 20.

The pairs of recesses 22a, 22b are formed respectively on both end portions, such that the recesses 22a, 22b are recessed in arcuate shapes and lie substantially in a horizontal direction with respect to the flat-shaped cylinder tube 12. More specifically, the recesses 22a, 22b are arranged facing each other, while being arcuately recessed in directions away from the center of the cylinder hole 20. The radius of curvature of the recesses 22a, 22b is set to be smaller than the radius of curvature on both end portions of the cylinder hole 20.

Specifically, the inner circumferential surface of the cylinder hole 20 is formed such that both end portions of the cylinder hole 20 are made larger only at the portions of the recesses 22a, 22b. Further, stepped portions 24 are disposed between the recesses 22a, 22b and a central region along the axial direction of the cylinder hole 20.

Further, ring grooves (installation grooves) 26 are formed respectively on both ends of the cylinder hole 20 along the inner circumferential surface thereof while facing the recesses 22a, 22b. Locking rings (retaining rings) 28a, 28b are installed respectively into the ring grooves 26.

On the other hand, a pair of first and second fluid ports 30, 32 through which a pressure fluid is supplied and discharged is formed on an outer side surface of the cylinder tube 12. The first and second fluid ports 30, 32 are separated a predetermined distance along the axial direction of the cylinder tube 12, and communicate respectively with the cylinder hole 20 through communication passages 34 (see FIG. 3). Accordingly, the pressure fluid supplied to the first and second fluid ports 30, 32 passes through the communication passages 34 and is introduced to the interior of the cylinder hole 20. Further, a plurality of sensor grooves 36, in which sensors may be installed that are capable of detecting the position of the piston 18, extend along the axial direction (in the direction of the arrows A and B) on the outer side surface of the cylinder tube 12.

The head cover 14 is formed with a substantially elliptical shape in cross section corresponding to the shape of the cylinder hole 20, and is installed in one end side (in the direction of the arrow A) of the cylinder tube 12. A pair of projections 38a are formed, which project a given length from the outer circumferential surface thereof on both side portions of the head cover 14 corresponding to the recesses 22a of the cylinder hole 20. The projections 38a are disposed on both side portions of the head cover 14, bulging outwardly with arcuate shapes and with a predetermined radius of curvature corresponding to that of the recesses 22a (see FIG. 5).

Further, an o-ring 40 is installed in an annular groove on an outer circumferential surface of the head cover 14. When the head cover 14 is installed in the cylinder hole 20 of the cylinder tube 12, an airtight condition is maintained by abutment of the o-ring 40 against the inner circumferential surface of the cylinder hole 20.

Similar to the head cover 14, the rod cover 16 is formed with a substantially elliptical shape in cross section corresponding to the shape of the cylinder hole 20, and is installed in the other end side (in the direction of the arrow B) of the cylinder tube 12. In addition, a pair of projections 38b are formed, which project a given length from the outer circumferential surface thereof on both side portions of the rod cover 16 corresponding to the recesses 22b of the cylinder hole 20. The projections 38b are disposed on the rod cover 16 on both side portions thereof, bulging outwardly with arcuate shapes, and with a predetermined radius of curvature corresponding to that of the recesses 22b (see FIG. 6).

Further, a rod hole 42, which penetrates along the axial direction, is formed at a substantially central portion of the rod cover 16, and a piston rod 44 connected to the piston 18 is inserted through the rod hole 42. A rod packing 46 and a bush 48 are installed on an inside portion of the rod hole 42, thereby maintaining an airtight condition at the interior of the cylinder hole 20.

Furthermore, an o-ring 40 is installed on the outer circumferential surface of the rod cover 16, in an annular groove at a substantially central portion in the axial direction of the rod cover 16. A plurality (for example, six) guide members 49, which are separated by predetermined distances, are disposed on an end portion symmetrical with the projections 38b while sandwiching the annular groove therebetween (see FIG. 2). The guide members 49 project at a given height with respect to the outer circumferential surface, such that when the rod cover 16 is inserted into the cylinder hole 20, the guide members 49 slidably contact the inner circumferential surface of the cylinder hole 20. That is, the guide members 49 are formed with shapes that correspond to the inner circumferential surface of the cylinder hole 20. The quantity of guide members 49 is not restricted to any particular number, so long as it is equal to or greater than four, and the guide members 49 are separated mutually from each other at predetermined distances.

Owing thereto, when the rod cover 16 is inserted into the cylinder hole 20, the rod cover 16 is guided with respect to the cylinder hole 20 by the plurality of guide members 49, and the rod cover 16 is properly positioned radially within the cylinder hole 20. As a result, the center of the cylinder hole 20 and the axial line of the rod cover 16 can be made to coincide with each other, and the piston rod 44, which is inserted through the cylinder hole 20, can be inserted with respect to the rod hole 42 of the rod cover 16 and pass therethrough accurately and with high precision.

The piston 18 is formed with a substantially elliptical shape in cross section. A pair of planar surface sections 50 are provided on the outer circumferential surface of the piston 18, and a pair of arcuate sections 52, which expand outwardly on outer sides with a given radius of curvature, are connected to both end portions of the planar surface sections 50. A piston packing 54 and a magnetic body 56 are installed on the outer circumferential surface, and the magnetic body 56 is covered by a piston cover 58. An outer circumferential surface of the piston cover 58 lies substantially on the same surface as the outer circumferential surface of the piston 18.

Further, a piston hole 60 that penetrates in the axial direction (in the direction of the arrows A and B) is formed on an inner portion of the piston 18, and a connecting portion 62 of the piston rod 44 is inserted through the piston hole 60.

The piston hole 60 includes a first hole 64 which is opened toward the side of the rod cover 16 (in the direction of the arrow B), a second hole 66 adjacent to the first hole 64 and which is reduced in diameter, and a tapered hole 68 adjacent to the second hole 66 and which gradually expands in diameter toward the side of the head cover 14 (in the direction of the arrow A). The first and second holes 64, 66 and the tapered hole 68 are mutually connected with one another.

On the other hand, on both end surfaces of the piston 18, a pair of damper grooves 70a, 70b is formed, the damper grooves 70a, 70b being recessed at a given depth. Cushion dampers 72a, 72b are installed respectively into each of the damper grooves 70a, 70b.

The damper grooves 70a, 70b extend substantially perpendicular to the axis of the piston 18 along both end surfaces and penetrate between the pair of planar surface sections 50. In addition, the damper grooves 70a, 70b include first grooves 74 that are formed adjacent to both end surfaces of the piston 18, and second grooves 76, which are recessed further inwardly from both end surfaces than the first grooves 74, and which are expanded in width with respect to the first grooves 74. The second grooves 76 are expanded in width by a predetermined width, in directions substantially perpendicular to the direction in which the damper grooves 70a, 70b extend.

The cushion dampers 72a, 72b are substantially rectangular plate shaped bodies in cross section, formed from an elastic material such as urethane rubber or the like, for example, and are disposed respectively so as to project a predetermined length outwardly from both end surfaces of the piston 18. The cushion dampers 72a, 72b include holes 78, which penetrate along the axial direction substantially in the center thereof, base members 80 that are inserted respectively into the damper grooves 70a, 70b, and guide members 82 that are expanded in width with respect to the base members 80, and which are inserted respectively into the second grooves 76 of the damper grooves 70a, 70b.

Further, the cushion dampers 72a, 72b are formed with cross sectional shapes that are substantially the same as the cross sectional shapes of the damper grooves 70a, 70b, such that the guide members 82 are inserted into the second grooves 76, whereas the base members 80 are inserted into the first grooves 74 and project outwardly, respectively, a given length with respect to both end surfaces of the piston 18.

Furthermore, the lengthwise dimension of the cushion dampers 72a, 72b is set substantially equal to the lengthwise dimension of the damper grooves 70a, 70b. Owing thereto, when the cushion dampers 72a, 72b are installed in the damper grooves 70a, 70b, the end surfaces of the cushion dampers 72a, 72b do not project outwardly from the planar surface sections 50 of the piston 18, and the holes 78 thereof are disposed so as to face the piston hole 60 of the piston 18. In addition, the piston rod 44 is inserted through the hole 78 of the cushion damper 72b that is disposed in the piston 18 on the side of the rod cover 16 (in the direction of the arrow B). The damper grooves 70a, 70b are covered completely by the cushion dampers 72a, 72b, as a result of installing the cushion dampers 72a, 72b therein.

In this manner, concerning the cushion dampers 72a, 72b, because the guide members 82, which are expanded in width with respect to the base members 80, engage with the second grooves 76 of the damper grooves 70a, 70b, relative displacements of the cushion dampers 72a, 72b in the axial direction with respect to the piston 18 are regulated. Stated otherwise, the cushion dampers 72a, 72b are installed while being capable of moving only in directions substantially perpendicular to the axis of the piston 18, along which the damper grooves 70a, 70b extend.

In addition, the cushion dampers 72a, 72b abut respectively against the head cover 14 and the rod cover 16 before the piston 18 does, at the displacement terminal end positions of the piston 18 upon displacement of the piston 18 along the cylinder tube 12. Owing thereto, shocks are appropriately buffered and absorbed by the cushion dampers 72a, 72b when the piston 18 abuts against the head cover 14 and the rod cover 16, and the impact of such shocks on the piston 18 is prevented. Stated otherwise, the cushion dampers 72a, 72b function as buffering mechanisms, capable of absorbing and buffering the impact of shocks to the piston 18.

The piston rod 44 is formed from a shaft having a predetermined length along the axial direction. A connecting portion 62 that is radially reduced in diameter is formed on one end thereof, which is connected to the piston 18. The connecting portion 62 is inserted through the second hole 66 and the tapered hole 68 of the piston hole 60. On the other hand, the other end of the piston rod 44 is inserted through the rod hole 42 and is supported displaceably by the bush 48 and the rod packing 46.

Further, concerning the piston rod 44, the boundary region thereof with the connecting portion 62 engages with a stepped portion between the first hole 64 and the second hole 66, whereby the piston rod 44 is positioned with respect to the piston 18. Furthermore, by pressing the end of the connecting portion 62, which is inserted into the tapered hole 68, toward the side of the second hole 66 (in the direction of the arrow B), the end portion thereof is plastically deformed along the tapered hole 68 and is expanded in diameter. As a result, the connecting portion 62 is caulked onto the tapered hole 68 of the piston 18 through the deformed end portion thereof, thereby connecting the piston rod 44 and the piston 18 together. Further, the connecting portion 62 of the piston rod 44 does not project beyond the end surface of the piston 18, and is caulked in such a way that it forms substantially the same surface with the end surface of the piston 18.

Figure 7:
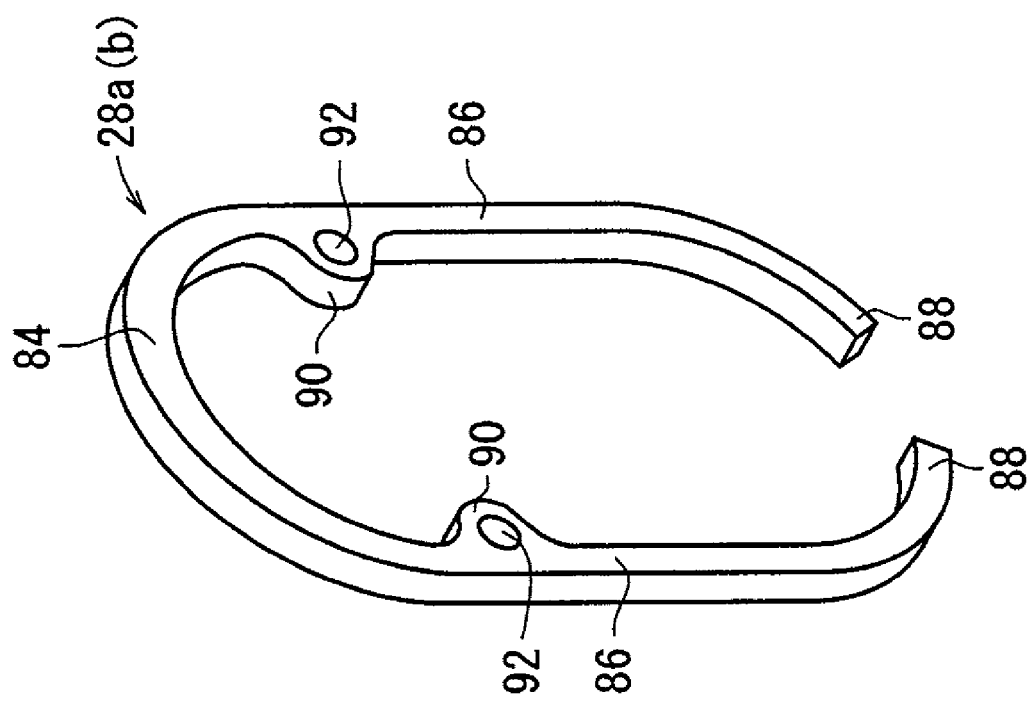
FIG. 7 is a perspective view showing the locking ring shown in FIG. 2 only.

As shown in FIG. 7, locking rings 28a, 28b are formed with substantially U-shaped cross sections from a metallic material, and are installed respectively into a pair of ring grooves 26, which are formed in the cylinder hole 20 of the cylinder tube 12. The locking rings 28a, 28b are formed with shapes corresponding to the ring grooves 26, and include a bent section 84, which is bent at a predetermined radius of curvature, a pair of arm sections (straight sections) 86 that extend in substantially straight lines from both ends of the bent section 84, and a pair of claw sections (arcuate sections) 88 disposed on ends of the arm sections 86, which are bent at a predetermined radius of curvature and are mutually separated a predetermined distance from each other. The claw sections 88 are positioned in confronting relation to the bent section 84 sandwiching the arm sections 86 therebetween, and the locking rings 28a, 28b possess a certain elasticity, which urges the pair of claw sections 88 themselves mutually in directions to separate a predetermined distance away from each other.

The bent section 84 is formed with a predetermined radius of curvature corresponding to both side portions of the cylinder hole 20, whereas the claw sections 88, similarly, are formed with a predetermined radius of curvature that corresponds to the side portions of the cylinder hole 20.

Bulging portions (projecting portions) 90, which bulge toward the inner side surface in a mutually facing relation to each other, are included on the arm sections 86. Jig holes (holes) 92 are formed respectively in the bulging portions 90.

Specifically, the bulging portions 90 and the jig holes 92 are disposed at positions on the arm sections 86 coinciding with sides of the bent section 84. In addition, by inserting an unillustrated jig (machine tool) into the pair of jig holes 92 and displacing the bulging portions 90 along with the jig holes 92 mutually in directions to approach one another, the arm sections 86 and the claw sections 88 can be elastically deformed so as to approach mutually toward each other about the junctures at the bent section 84. When the locking rings 28a, 28b are deformed in directions so that the arm sections 86 and the claw sections 88 are caused to mutually approach one another, the separation distance between the claw sections 88 is set beforehand such that plastic deformation does not occur in the locking rings 28a, 28b.

Specifically, the bent section 84 and the claw sections 88 of the locking rings 28a, 28b are made to engage with both side portions of the cylinder hole 20 in the ring grooves 26.

In addition, the locking rings 28a, 28b are installed respectively into the ring grooves 26 after the head cover 14 and the rod cover 16 have been installed with respect to the cylinder hole 20 of the cylinder tube 12. Accordingly, the head cover 14 and the rod cover 16 are fixed by means of the projections 38a, 38b thereof and the locking rings 28a, 28b. At this time, the head cover 14 and the rod cover 16 do not protrude from the end surfaces of the cylinder tube 12.

The fluid pressure cylinder 10 employing a retaining ring according to the present invention is basically constructed as described above. Next, an explanation shall be given concerning assembly of the fluid pressure cylinder 10.

First, when the cushion dampers 72a, 72b are installed onto the piston 18, the guide members 82 of the cushion dampers 72a, 72b are arranged on respective sides of the piston 18, and the cushion dampers 72a, 72b are disposed in the end sides of the opened damper grooves 70a, 70b. Additionally, the cushion dampers 72a, 72b are slidably displaced toward the piston 18 to insert the guide members 82 into the second grooves 76. Specifically, the cushion dampers 72a, 72b are displaced along the damper grooves 70a, 70b in directions substantially perpendicular to the axis of the piston 18.

Owing thereto, the cushion dampers 72a, 72b that make up the guide members 82 are inserted into the second grooves 76, and along therewith, the base members 80 thereof are inserted into the first grooves 74.

Additionally, installation of the cushion dampers 72a, 72b is completed when the end portions of the cushion dampers 72a, 72b are moved into agreement and become flush with the planar surface sections 50 of the piston 18. In this case, the holes 78 of the cushion dampers 72a, 72b are positioned coaxially with the piston hole 60 of the piston 18, and the cushion dampers 72a, 72b protrude, at a predetermined height, with respect to both end surfaces of the piston 18 (see FIG. 3).

In this manner, by slidably displacing the cushion dampers 72a, 72b in directions substantially perpendicular to the axis of the piston 18 with respect to the damper grooves 70a, 70b provided on both end surfaces of the piston 18, the cushion dampers 72a, 72b can be installed easily. In addition, because the guide members 82 engage within the second grooves 76, the cushion dampers 72a, 72b are not displaceable in axial directions with respect to the piston 18.

Further, although the cushion dampers 72a, 72b are displaceable in directions substantially perpendicular to the axis of the piston 18, upon insertion of the piston 18 into the cylinder hole 20 of the cylinder tube 12, owing to the fact that the outer circumferential surface of the piston 18 becomes surrounded by the inner circumferential surface of the cylinder hole 20, displacement of the cushion dampers 72a, 72b in directions substantially perpendicular to the axis of the piston 18 also is regulated.

As a result, the cushion dampers 72a, 72b normally are displaced integrally and in unison with displacement of the piston 18, thereby enabling shocks imparted to the piston 18 at the displacement terminal end positions of the piston 18 to be reliably and suitably buffered.

Next, explanations shall be made concerning the case in which the piston 18, with the pair of cushion dampers 72a, 72b installed thereon, is inserted into the cylinder tube 12, and then the head cover 14 and the rod cover 16 are assembled onto both ends of the cylinder tube 12.

At first, the head cover 14 is inserted through the cylinder hole 20 from one end side of the cylinder tube 12, and is pressed into the interior of the cylinder hole 20 toward the piston 18 (in the direction of the arrow B), until the projections 38a thereof abut against the stepped portion 24 of the recesses 22a disposed in the cylinder hole 20. Further, after the projections 38a abut against the stepped portion 24 and displacement of the head cover 14 toward the other end side of the cylinder tube 12 that forms the piston 18 side thereof (in the direction of the arrow B) is regulated, the locking ring 28a is inserted into the cylinder hole 20 and is installed in the ring groove 26 from the one end side of the cylinder tube 12.

In this case, the arm sections 86 and the claw portions 88 are deformed in directions so as to approach one another by the jig (not shown), which is inserted into the pair of jig holes 92. As a result, after the locking ring 28a has been inserted up to a position alongside the ring groove 26, the locking ring 28a is deformed again by releasing the held state of the arm sections 86 by the jig, whereupon due to its elasticity the locking ring 28a expands radially outward and engages within the ring groove 26.

Accordingly, displacement of the head cover 14 toward the inside of the cylinder tube 12 (in the direction of the arrow B) is regulated in the axial direction by engagement of the projections 38a of the head cover 14 within the recesses 22a of the cylinder hole 20. Moreover, displacement of the head cover 14 outside of the cylinder tube 12 (in the direction of the arrow A) also is regulated by the locking ring 28a installed within the ring groove 26. That is, the head cover 14 becomes fixed into one end side of the cylinder tube 12, and is accommodated therein without protruding outwardly from the one end of the cylinder tube 12.

Further, because the rod cover 16 is guided along the cylinder hole 20 by the plurality of guide members 49 disposed on the outer circumferential surface thereof, the axis of the rod hole 42 in the rod cover 16 and the center of the cylinder hole 20 can suitably be made to coincide with each other, so that the piston rod 44 that is inserted through the cylinder hole 20 can easily and reliably be inserted with respect to the rod hole 42.

Figure 8:
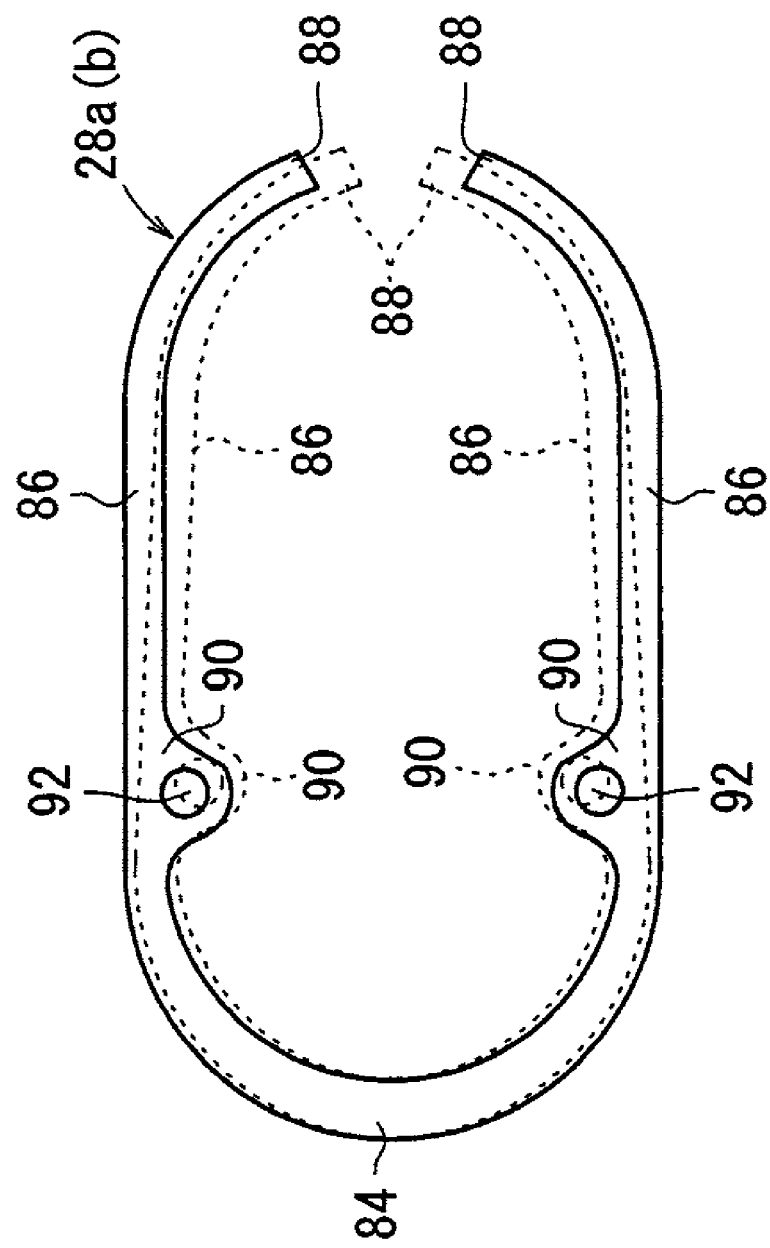
FIG. 8 is a plan view of the locking ring shown in FIG. 7.

On the other hand, the rod cover 16 is inserted through the cylinder hole 20 from the other end side of the cylinder tube 12, while the piston rod 44 is inserted through the rod hole 42, and the rod cover 16 is pressed into the interior of the cylinder hole 20 toward the piston 18 (in the direction of the arrow A), until the projections 38b thereof abut against the stepped portion 24 of the recesses 22b disposed in the cylinder hole 20. In addition, after the projections 38b abut against the stepped portion 24 of the recesses 22b and displacement of the rod cover 16 toward the one end side of the cylinder tube 12 that forms a piston 18 side thereof (in the direction of the arrow A) is regulated, the locking ring 28b is inserted into the cylinder hole 20 and is installed in the ring groove 26 from the other end side of the cylinder tube 12. In this case, the arm sections 86 and the claw portions 88 are deformed in directions so as to approach one another by the jig (not shown), which is inserted into the pair of jig holes 92 (refer to the broken line shape in FIG. 8). As a result, after the locking ring 28b has been inserted up to a position alongside the ring groove 26, by releasing the held state of the arm sections 86 by the jig, the locking ring 28b is deformed so as to expand radially outward due to its elasticity, and the locking ring 28b engages within the ring groove 26.

Accordingly, displacement of the rod cover 16 toward the inside of the cylinder tube 12 (in the direction of the arrow A) is regulated in the axial direction by engagement of the projections 38b of the rod cover 16 within the recesses 22b of the cylinder hole 20. Moreover, displacement of the rod cover 16 outside of the cylinder tube 12 (in the direction of the arrow B) also is regulated by the locking ring 28b installed within the ring groove 26. That is, the rod cover 16 becomes fixed into the other end side of the cylinder tube 12, and is accommodated therein without protruding outwardly from the other end of the cylinder tube 12.

In this manner, when the head cover 14 and the rod cover 16 are installed onto both ends of the cylinder tube 12, the pairs of projections 38a, 38b are made to engage respectively within the pairs of recesses 22a, 22b provided in the cylinder hole 20 of the cylinder tube 12, and the locking rings 28a, 28b, which are inserted from ends of the cylinder hole 20, are made to engage within the ring grooves 26. Owing thereto, displacements of the head cover 14 and the rod cover 16 in axial directions can easily and reliably be regulated.

Next, explanations shall be given concerning operations and effects of the fluid pressure cylinder 10, which has been assembled in the foregoing manner. Such explanations shall be made assuming the state shown in FIG. 3, in which the piston 18 is displaced toward the side of the head cover 14 (in the direction of the arrow A), is taken as an initial position.

First, pressure fluid from an unillustrated pressure fluid supply source is introduced into the first fluid port 30. In this case, the second fluid port 32 is placed in a state of being open to atmosphere, under a switching action of an unillustrated directional control valve. As a result, the pressure fluid is introduced to the interior of the cylinder hole 20 from the first fluid port 30 through the communication passage 34, whereupon the piston 18 is pressed toward the side of the rod cover 16 (in the direction of the arrow B) by the pressure fluid introduced between the head cover 14 and the piston 18. Additionally, by abutment of the cushion damper 72b installed at the end surface of the piston 18 against the end surface of the rod cover 16, the displacement of the piston 18 reaches the regulated displacement terminal end position thereof. At this time, shocks generated upon abutment are buffered by the cushion damper 72b, and such shocks are prevented from exerting an impact on the piston 18.

On the other hand, in the event that the piston 18 is displaced in the opposite direction (in the direction of the arrow A), pressure fluid is supplied to the second fluid port 32, while the first fluid port 30 is placed in a state of being open to atmosphere, under a switching action of the directional control valve (not shown). The pressure fluid is introduced to the interior of the cylinder hole 20 from the second fluid port 32 through the communication passage 34, whereupon the piston 18 is pressed toward the side of the head cover 14 (in the direction of the arrow A) by the pressure fluid introduced between the rod cover 16 and the piston 18. Additionally, upon displacement of the piston 18, the piston rod 44 and the cushion damper 72a are displaced integrally toward the side of the head cover 14, and by abutment of the cushion damper 72a that confronts the head cover 14 against the end surface of the head cover 14, the piston 18 returns to the initial position in which the displacement of the piston 18 is regulated. At this time, similarly, shocks generated upon abutment are buffered by the cushion damper 72a, and such shocks are prevented from exerting an impact on the piston 18.

In the above manner, in the present embodiment, the locking rings 28a, 28b have a pair of bulging portions 90 disposed on inner sides of the arm sections 86 and the bent section 84 that interconnects the pair of arm sections 86, and jig holes 92 are provided respectively in the bulging portions 90 into which a jig (not shown) can be inserted. Owing thereto, the bent section 84 is deformed under a gripping action by the unillustrated jig, so as to be reduced in diameter in a radially inward direction, and moreover, the pairs of arm sections 86 and claw sections 88 can be displaced about the bent section 84 in directions to mutually approach one another. As a result, the displaced locking rings 28a, 28b can be inserted respectively into the cylinder hole 20 and be suitably installed into each of the ring grooves 26.

Further, on the locking rings 28a, 28b, the bent section 84, having a predetermined radius, and the claw sections 88 that confront the bent section 84 while sandwiching the arm sections 86 therebetween, are formed with substantially the same radius of curvature. Owing thereto, when the locking rings 28a, 28b are installed into the ring grooves 26 of the cylinder hole 20, the bent section 84, the arm sections 86 and the claw sections 88 are all installed properly along the ring grooves 26. As a result, the outer peripheral regions of the locking rings 28a, 28b are tightly fixed over a wide area with respect to the ring grooves 26, and a large holding force is attained and applied to the head cover 14 and the rod cover 16, by the locking rings 28a, 28b.

Stated otherwise, because the locking rings 28a, 28b engage within the ring grooves 26 at a substantially uniform depth, a stable holding force is attained with respect to the head cover 14 and the rod cover 16 by the locking rings 28a, 28b.

Figure 9:
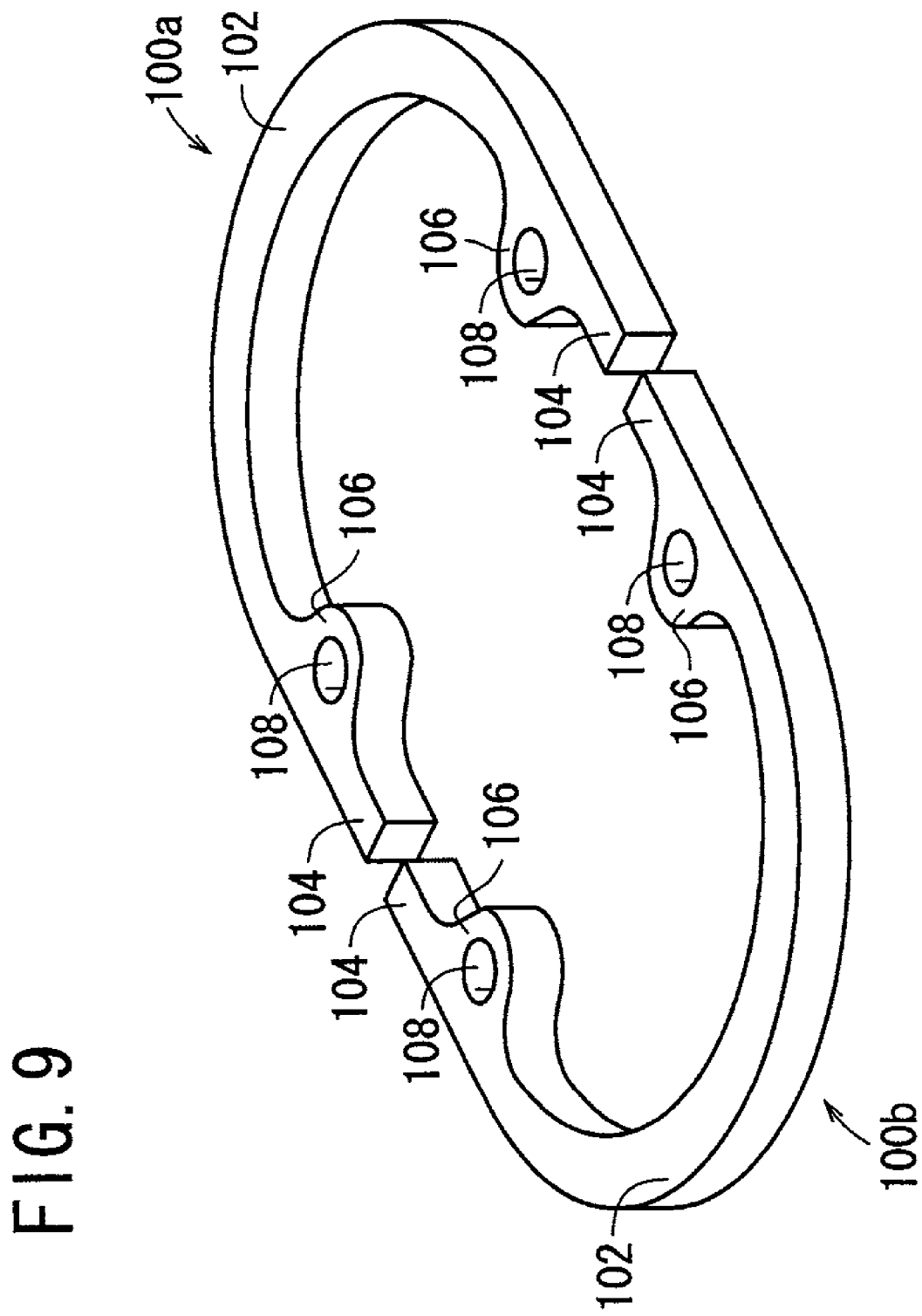
FIG. 9 is an exterior perspective view showing the locking ring according to a first modified example.
Figure 10:
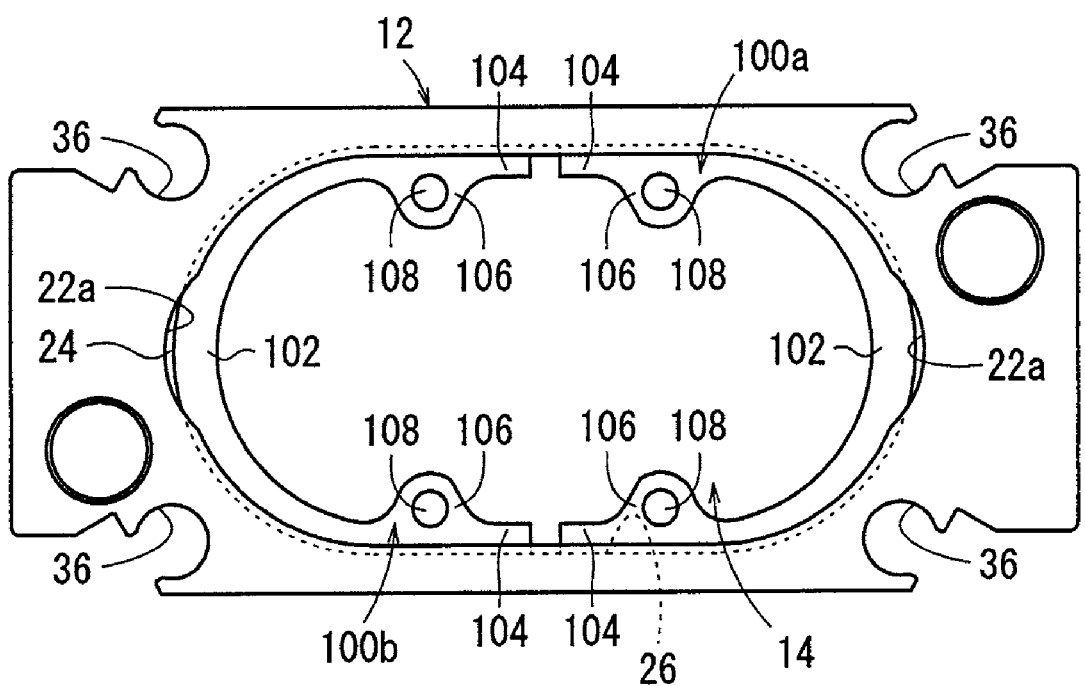
FIG. 10 is a side surface view, as viewed from a head cover side of the fluid pressure cylinder, in which the locking ring shown in FIG. 9 is installed.
Figure 11:
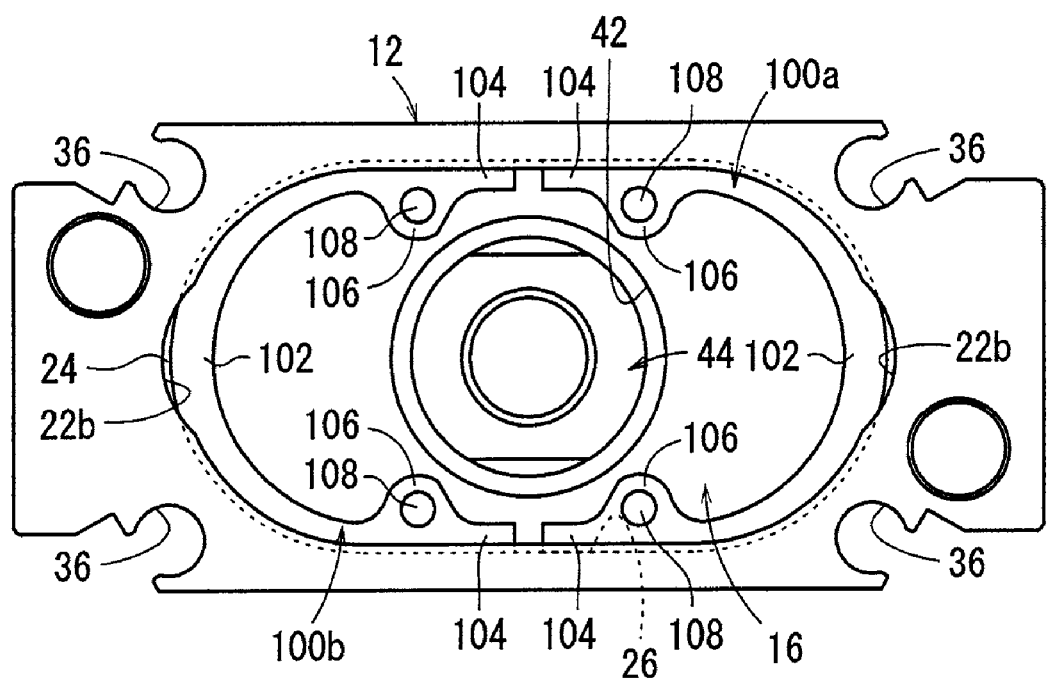
FIG. 11 is a side surface view, as viewed from a rod cover side of the fluid pressure cylinder, in which the locking ring shown in FIG. 9 is installed.
Figure 12:
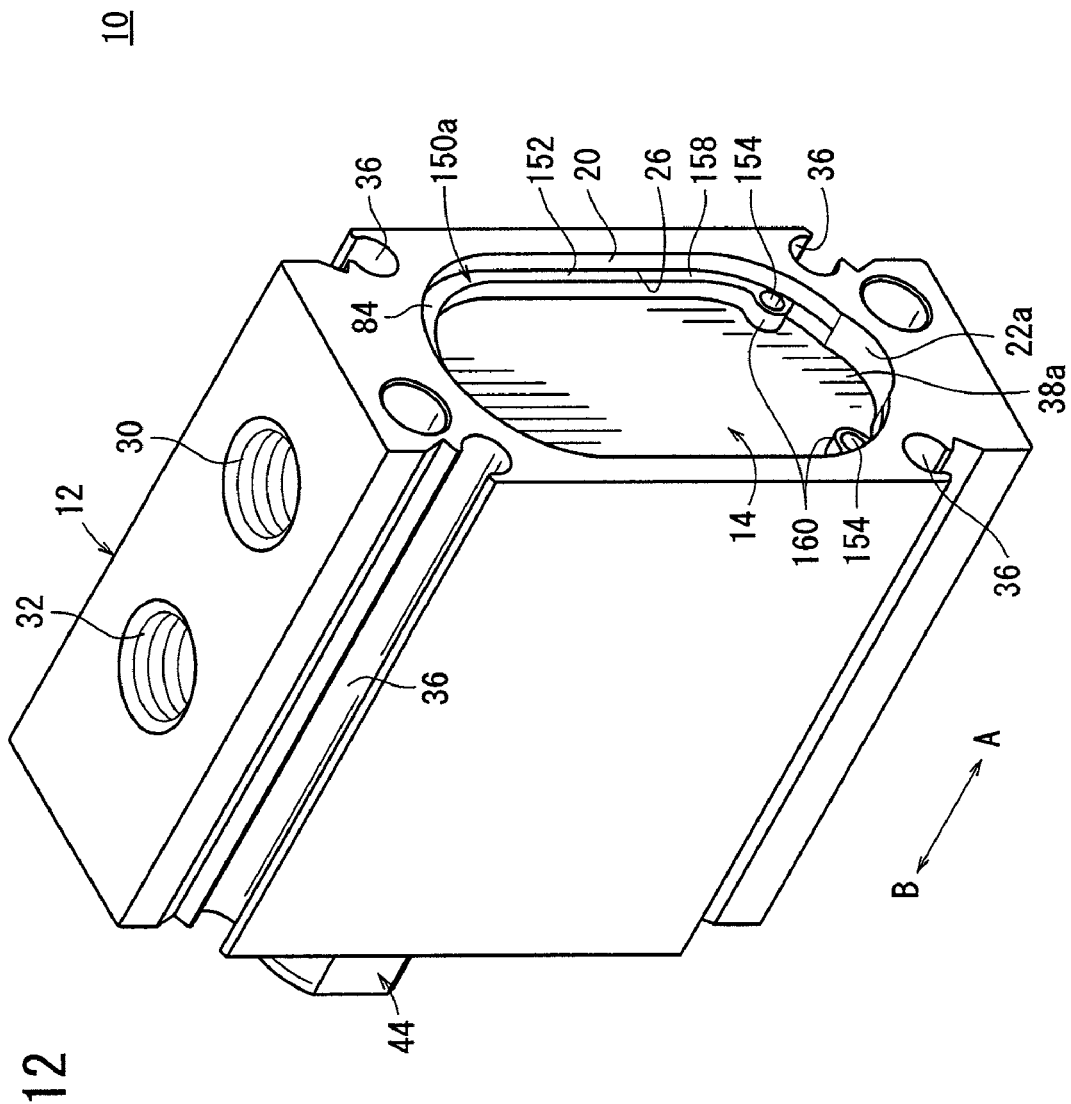
FIG. 12 is an exterior perspective view showing a state in which a locking ring according to a second modified example is installed in the fluid pressure cylinder.
Figure 13:
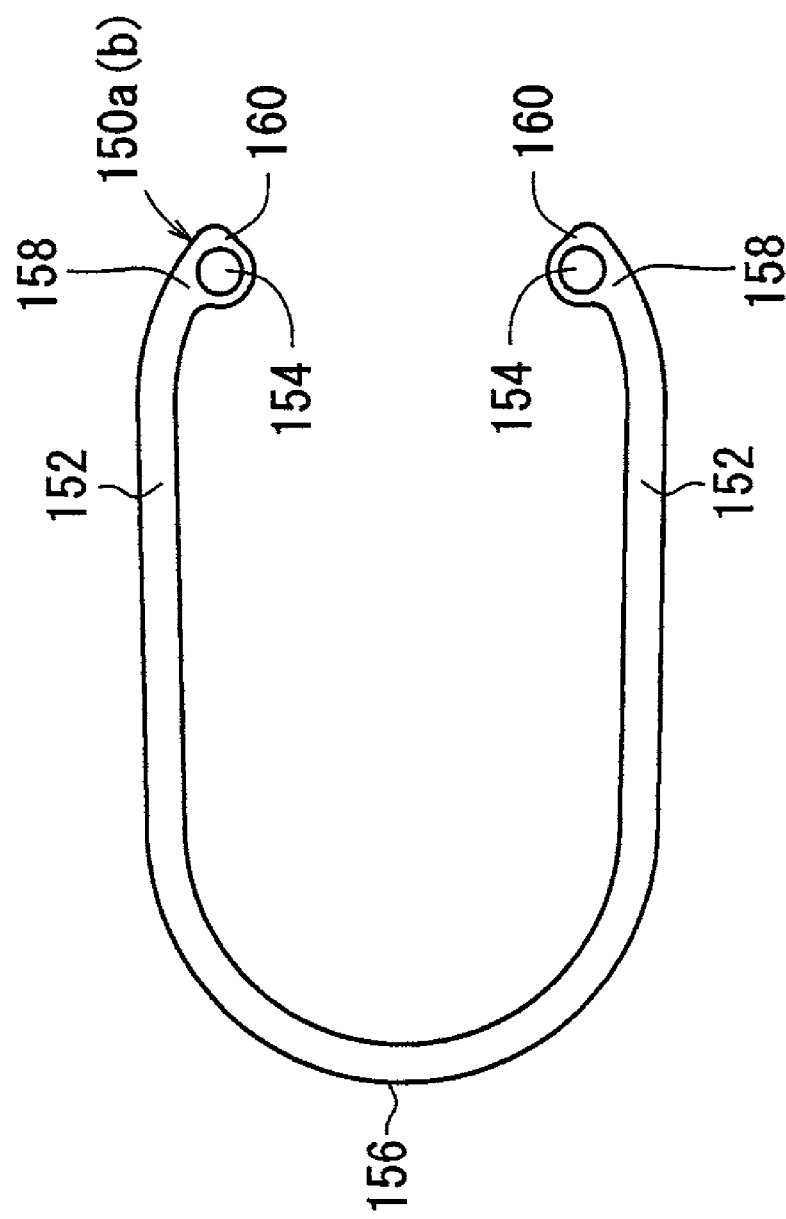
FIG. 13 is a plan view showing the locking ring shown in FIG. 12 only.
Figure 14:
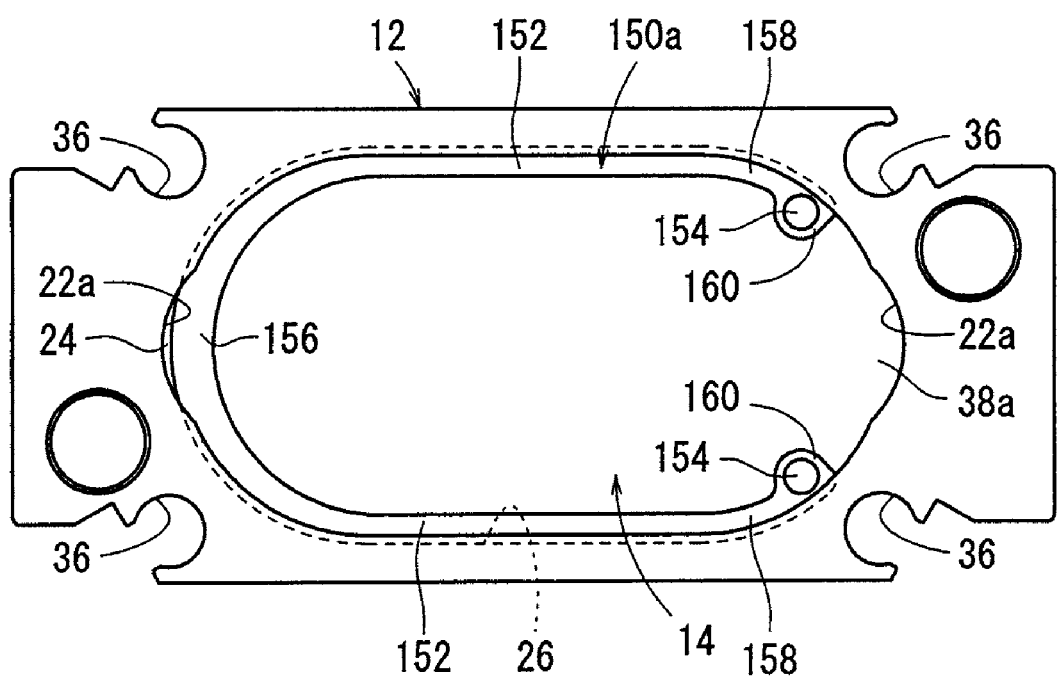
FIG. 14 is a side surface view, as viewed from a head cover side of the fluid pressure cylinder shown in FIG. 13.
Figure 15:
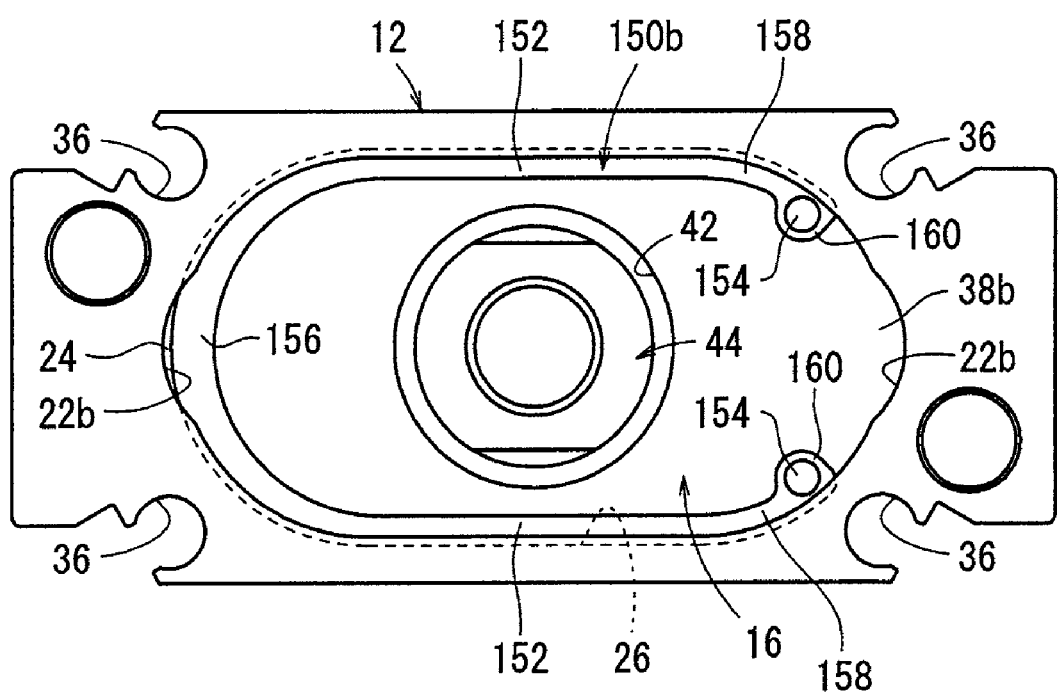
FIG. 15 is a side surface view, as viewed from a rod cover side of the fluid pressure cylinder shown in FIG. 13.

In place of the locking rings 28a, 28b described above, a pair of locking rings 100a, 100b may also be installed respectively with respect to a single ring groove 26, as shown in FIGS. 9 through 11.

The locking rings 100a, 100b according to a first modified example each are formed with a substantially U-shaped cross section, including a bent section 102, and a pair of arm sections 104, which extend respectively from ends of the bent section 102. The arm sections 104 include mutually confronting bulging portions 106, which bulge on the inner side surfaces thereof, with jig holes 108 formed respectively in the bulging portions 106.

As for the locking rings 100a, 100b, one of the locking rings 100a is installed in the ring groove 26 on one side surface of the cylinder tube 12, whereas the other locking ring 100b is installed in the ring groove 26 on the other side surface of the cylinder tube 12 (see FIGS. 10 and 11). More specifically, the locking rings 100a, 110b are disposed substantially symmetrically about the center of the cylinder tube 12, such that the arm sections 104 are arranged mutually face-to-face with each other. In this case, the locking rings 100a and 100b are separated a predetermined distance from one another. As a result, even in the event that the cylinder tube 12 is deformed slightly in the length dimension by a pressure fluid supplied into the cylinder hole 20, the locking rings 100a, 100b are deformed in compliance with the ring grooves 26. Owing thereto, even when the cylinder tube 12 is deformed, it is possible for the head cover 14 and the rod cover 16 to be maintained in a securely fixed state.

Further, as shown in FIGS. 12 through 15, locking rings 150a, 150b according to a second modified example differ from the locking rings 28a, 28b of the present embodiment, as well as from the locking rings 100a, 100b according to the first modified example, in that the locking rings 150a, 150b have jig holes 154 respectively on both ends of the arm sections 152.

As shown in FIGS. 12 through 15, a pair of locking rings 150a, 150b, which are substantially U-shaped in cross section and formed from a metal material, may be installed respectively into the pair of ring grooves 26 formed in the cylinder hole 20 of the cylinder tube 12.

The locking rings 150a, 150b are formed with shapes corresponding to the ring grooves 26, and include a bent section 156, which is bent at a predetermined radius of curvature, a pair of arm sections 152 that extend in substantially straight lines from both ends of the bent section 156, and a pair of claw sections 158 disposed on ends of the arm sections 152, which are bent at a predetermined radius of curvature and are mutually separated a predetermined distance from each other. The claw sections 158 are positioned in confronting relation to the bent section 156 and sandwiches the arm sections 152 therebetween, and the locking rings 150a, 150b possess a certain elasticity, which urges the pair of claw sections 158 themselves mutually in directions to separate a predetermined distance away from each other. The bent section 156 has the same structure as the bent section 84 constituting the locking rings 28a, 28b, and thus detailed explanations of this feature are omitted.

The claw sections 158 include bulging portions 160, which mutually face one another and bulge on inner side surfaces of the claw sections 158. Jig holes 154 are formed respectively in each of the bulging portions 160. In addition, by inserting an unillustrated jig into the pair of jig holes 154 and displacing the bulging portions 160 along with the jig holes 154 mutually in directions to approach one another, the arm sections 152 and the claw sections 158 can be elastically deformed so as to approach mutually toward each other about the juncture at the bent section 156.

In addition, the locking rings 150a, 150b are installed respectively into the ring grooves 26 after the head cover 14 and the rod cover 16 have been installed with respect to the cylinder hole 20 of the cylinder tube 12. Accordingly, the head cover 14 and the rod cover 16 are fixed by means of the projections 38a, 38b thereof and the locking rings 150a, 150b. At this time, the head cover 14 and the rod cover 16 do not protrude from the end surfaces of the cylinder tube 12.

The retaining ring for use in a fluid pressure cylinder according to the present invention is not limited to the aforementioned embodiments, and naturally various other configurations may be adopted without departing from the essential features and gist of the present invention.

What is claimed is:

1. A retaining ring for use in a fluid pressure cylinder, the retaining ring being disposed in said fluid pressure cylinder in which a piston, which is installed in a cylinder body having a cross sectionally elliptically shaped cylinder chamber, is displaced by a pressure fluid, said retaining ring fixing a cover member that is installed into an end of said cylinder body, said retaining ring comprising:

a bent section installed on an inner wall surface of said cylinder chamber and which is bent along the inner wall surface of said cylinder chamber;

a pair of straight sections extending from both ends of said bent section and arranged substantially in parallel with each other; and a pair of bulging portions disposed on said straight sections and having holes into which a machine tool may be inserted;

a pair of arcuate sections provided on ends of said straight sections, said arcuate sections being formed with substantially the same radius of curvature as said bent section and bent in directions to mutually approach one another, and wherein said bent section and said arcuate sections are disposed in confronting relation to each other while sandwiching said straight sections therebetween, wherein said bent section and said straight sections are deformed and separated away from said inner wall surface by the machine tool, which is inserted into said holes.

2. The retaining ring for the fluid pressure cylinder according to claim 1, wherein said bulging portions are disposed in mutually confronting relation to each other on said pair of straight sections.

3. The retaining ring for the fluid pressure cylinder according to claim 1, wherein said retaining ring engages in an installation groove formed in said cylinder chamber, for thereby latching said cover member.

4. The retaining ring for the fluid pressure cylinder according to claim 1, wherein said bulging portions are disposed at boundaries between said bent section and said straight sections.

5. The retaining ring for the fluid pressure cylinder according to claim 1, wherein said bulging portions are disposed in the vicinity of ends of said straight sections.

6. A retaining ring for use in a fluid pressure cylinder, the retaining ring being disposed in said fluid pressure cylinder in which a piston, which is installed in a cylinder body having a cross sectionally elliptically shaped cylinder chamber, is displaced by a pressure fluid, said retaining ring fixing a cover member that is installed into an end of said cylinder body, said retaining ring comprising:

a bent section installed on an inner wall surface of said cylinder chamber and which is bent along the inner wall surface of said cylinder chamber;

a pair of straight sections extending from both ends of said bent section and arranged substantially in parallel with each other; and a pair of bulging portions disposed on said straight sections and having holes into which a machine tool may be inserted, wherein said bent section and said straight sections are deformed and separated away from said inner wall surface by the machine tool, which is inserted into said holes, and wherein said bulging portions are disposed at boundaries between said bent section and said straight sections.

7. The retaining ring for the fluid pressure cylinder according to claim 6, wherein said bulging portions are disposed in mutually confronting relation to each other on said pair of straight sections.

8. The retaining ring for the fluid pressure cylinder according to claim 6, further comprising a pair of arcuate sections provided on ends of said straight sections, said arcuate sections being formed with substantially the same radius of curvature as said bent section and bent in directions to mutually approach one another, and wherein said bent section and said arcuate sections are disposed in confronting relation to each other while sandwiching said straight sections therebetween.

9. The retaining ring for the fluid pressure cylinder according to claim 6, wherein said retaining ring engages in an installation groove formed in said cylinder chamber, for thereby latching said cover member.

10. A pair of retaining rings for use in a fluid pressure cylinder, the pair of retaining rings being disposed in said fluid pressure cylinder in which a piston, which is installed in a cylinder body having a cross sectionally elliptically shaped cylinder chamber, is displaced by a pressure fluid, said pair of retaining rings fixing a cover member that is installed into one end of said cylinder body, each of said pair of retaining rings comprising:

a bent section installed on an inner wall surface of said cylinder chamber and which is bent along the inner wall surface of said cylinder chamber;

a pair of straight sections extending from both ends of said bent section and arranged substantially in parallel with each other; and a pair of bulging portions disposed on said straight sections and having holes into which a machine tool may be inserted, wherein said bent section and said straight sections are deformed and separated away from said inner wall surface by the machine tool, which is inserted into said holes, and wherein said pair of retaining rings is installed on said one end of said cylinder body substantially symmetrically about a central axis of said cylinder body.

* * * * *